(12) United States Patent
Hariu et al.

(10) Patent No.: US 12,151,555 B2
(45) Date of Patent: Nov. 26, 2024

(54) ACCELERATOR DEVICE

(71) Applicant: DENSO CORPORATION, Kariya (JP)

(72) Inventors: Tetsuo Hariu, Kariya (JP); Takuto Kita, Kariya (JP); Yuusuke Yoshida, Kariya (JP); Kiyoshi Kimura, Kariya (JP); Takehiro Saito, Kariya (JP); Soichi Kinouchi, Kariya (JP); Etsugo Yanagida, Kariya (JP); Daisuke Hokuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 24 days.

(21) Appl. No.: 18/181,926

(22) Filed: Mar. 10, 2023

(65) Prior Publication Data
US 2023/0211659 A1 Jul. 6, 2023

Related U.S. Application Data

(63) Continuation of application No. PCT/JP2021/032666, filed on Sep. 6, 2021.

(30) Foreign Application Priority Data

Sep. 16, 2020 (JP) ................. 2020-155639

(51) Int. Cl.
*B60K 26/02* (2006.01)
*B60Q 9/00* (2006.01)
*B60W 60/00* (2020.01)

(52) U.S. Cl.
CPC ............ *B60K 26/021* (2013.01); *B60Q 9/00* (2013.01); *B60W 60/0053* (2020.02); *B60K 2026/022* (2013.01)

(58) Field of Classification Search
CPC .......... B60K 26/021; B60K 2026/022; B60W 60/0053; B60Q 9/00
See application file for complete search history.

(56) References Cited

U.S. PATENT DOCUMENTS 5,568,797 A * 10/1996 Landerretche ....... B60K 26/021
    123/396
6,542,793 B2 * 4/2003 Kojima ................. G05G 1/30
    303/113.5

(Continued)

FOREIGN PATENT DOCUMENTS

JP    2006-143120    6/2006
JP    2006143119 A * 6/2006 ............. B60K 31/00

(Continued)

OTHER PUBLICATIONS

Machine translation of JP-2008132980-A obtained from FIT database (Year: 2008).*

(Continued)

*Primary Examiner* — Thomas C Diaz
(74) *Attorney, Agent, or Firm* — Nixon & Vanderhye P.C.

(57) ABSTRACT

An accelerator device includes a pedal lever, a reaction force adjuster and a controller. The pedal lever operates according to a stepping operation. The reaction force adjuster is driven by an actuator, and is capable of adjusting a reaction force that is a force in a direction of pushing back the pedal lever. The controller includes a target operation amount setting unit and a drive control unit. The target operation amount setting unit sets a target operation amount, which is an operation amount of the pedal lever according to a vehicle speed. The drive control unit controls a drive of the actuator. The controller controls the reaction force according to the target operation amount so that the operation amount of the pedal lever is within a target range when switching from an automatic drive to a manual drive.

10 Claims, 14 Drawing Sheets

(56) References Cited

U.S. PATENT DOCUMENTS

| | | | | |
|---|---|---|---|---|
| 6,615,943 | B1* | 9/2003 | Gustafsson | G05G 1/30 |
| | | | | 180/170 |
| 6,675,923 | B1* | 1/2004 | Artis | G05G 5/03 |
| | | | | 180/170 |
| 6,981,486 | B2* | 1/2006 | Yone | F02D 11/106 |
| | | | | 74/513 |
| 7,331,256 | B2* | 2/2008 | Allard | B60K 26/021 |
| | | | | 74/512 |
| 9,176,515 | B2* | 11/2015 | Maruyama | G05G 1/40 |
| 10,166,867 | B2* | 1/2019 | Florentin | B60W 30/143 |
| 2016/0251018 | A1 | 9/2016 | Schnieders et al. | |
| 2018/0113454 | A1 | 4/2018 | Emura et al. | |
| 2019/0381881 | A1 | 12/2019 | Tayama | |

FOREIGN PATENT DOCUMENTS

| | | | | |
|---|---|---|---|---|
| JP | 2008-132980 | | 6/2008 | |
| JP | 2008132980 | A * | 6/2008 | B60W 30/16 |

OTHER PUBLICATIONS

Machine translation of JP-2006143119-A obtained from FIT database (Year: 2006).*

* cited by examiner

FIG. 4A
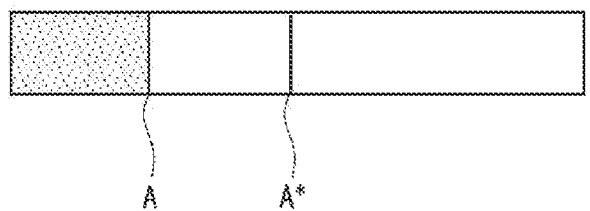
FIG. 4B
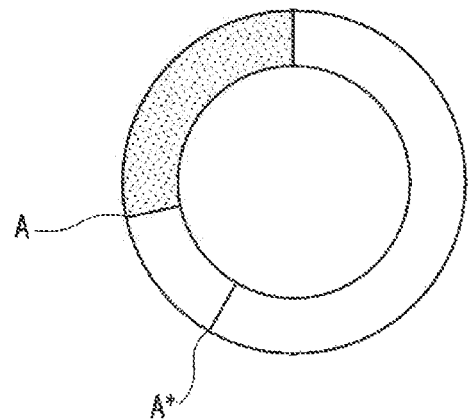
FIG. 4C
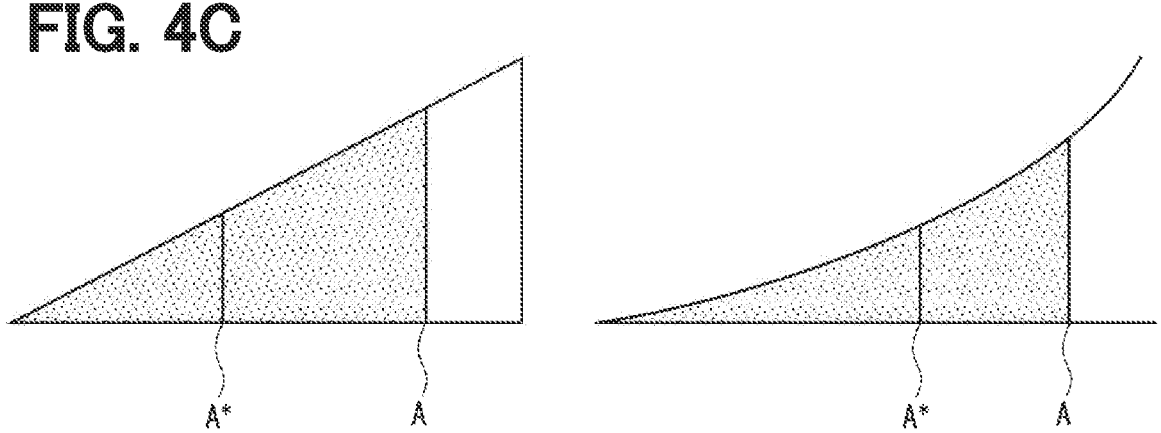
FIG. 4D
| CURRENT OPENING DEGREE | TARGET OPENING DEGREE |
|---|---|
| 20% | 10% |

ACCELERATOR DEVICE

CROSS REFERENCE TO RELATED APPLICATIONS

The present application is a continuation application of International Patent Application No. PCT/JP2021/032666 filed on Sep. 6, 2021, which designated the U.S. and claims the benefit of priority from Japanese Patent Application No. 2020-155639 filed on Sep. 16, 2020. The entire disclosures of all of the above applications are incorporated herein by reference.

TECHNICAL FIELD

The present disclosure relates to an accelerator device.

BACKGROUND

Conventionally, an accelerator pedal module including an actuator is known. For example, when shifting from an automatic drive to a manual drive, an accelerator pedal is adjusted using a pedal actuator to set a pedal position corresponding to the movement of the vehicle during the automatic drive, and then manual drive is started.

SUMMARY

An accelerator device of the present disclosure includes a pedal lever, a reaction force adjuster, and a controller. The pedal lever operates according to a stepping operation. The reaction force adjuster is driven by an actuator, and is configured to adjust a reaction force in a direction of pushing back the pedal lever.

The controller may include a target operation amount setting unit and a drive control unit. The target operation amount setting unit may be configured to set a target operation amount of the pedal lever in accordance with a vehicle speed. The drive control unit may be configured to control a drive of the actuator. The controller may be configured to control the reaction force in accordance with the target operation amount of the pedal lever so as to make an operation amount of the pedal lever to be within a target range, when switching from an automatic drive to a manual drive. Thus, it is possible to appropriately switch from the automatic drive to the manual drive in the vehicle.

BRIEF DESCRIPTION OF THE DRAWINGS

The above and other objects, features and advantages of the present disclosure will become more apparent from the following detailed description made with reference to the accompanying drawings. In the drawings:

FIG. 4A is a diagram showing a display example of an accelerator opening degree and a target accelerator opening degree according to the first embodiment;

FIG. 4B is a diagram showing another display example of the accelerator opening degree and the target accelerator opening degree according to the first embodiment;

FIG. 4C is a diagram showing another display example of the accelerator opening degree and the target accelerator opening degree according to the first embodiment;

FIG. 4D is a diagram showing another display example of the accelerator opening degree and the target accelerator opening degree according to the first embodiment;

DETAILED DESCRIPTION

Figure 1:
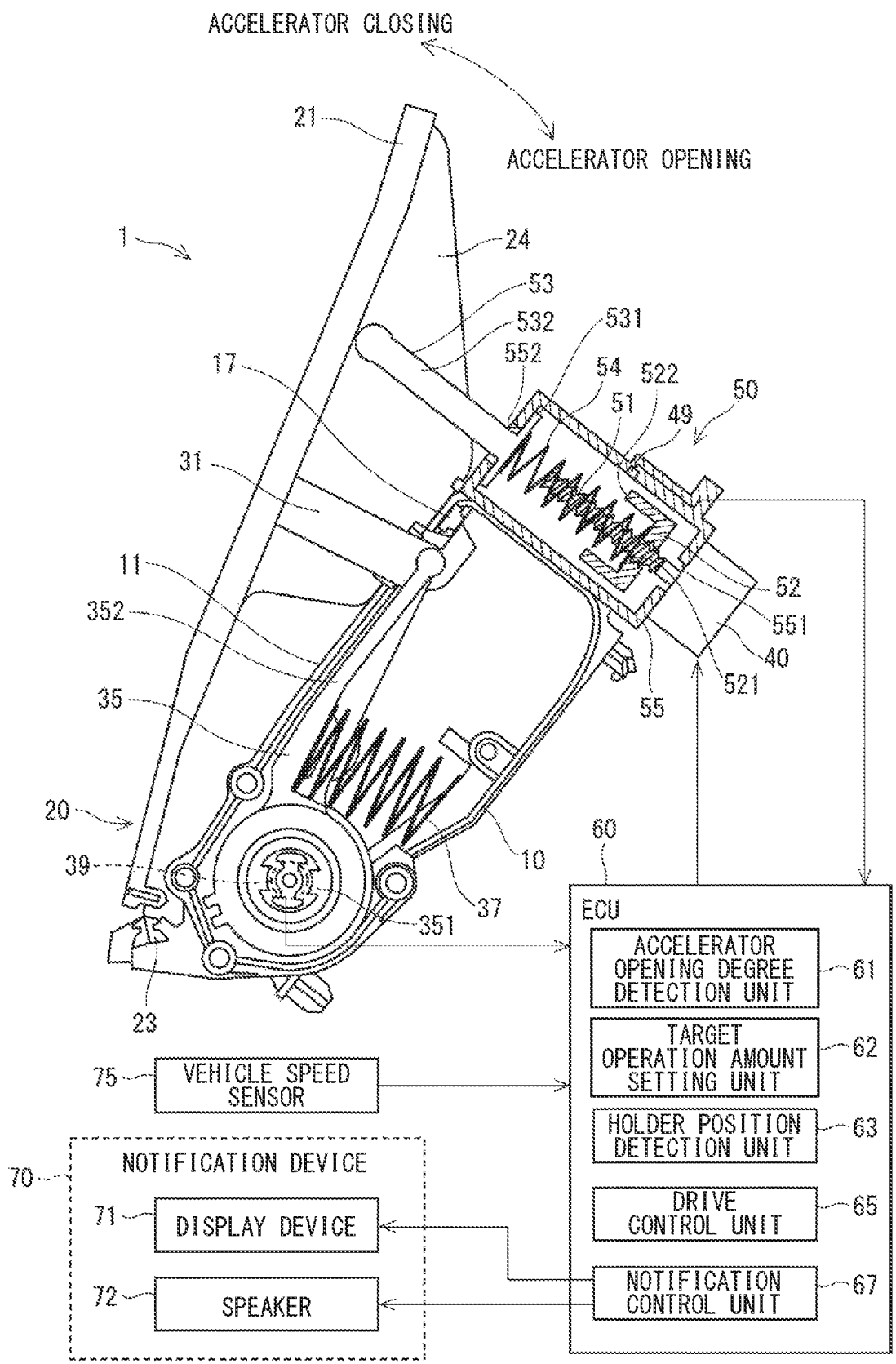
FIG. 1 is a cross-sectional view of an accelerator device according to a first embodiment.

A pedal position may be adjusted at a timing of switching from an automatic drive to a manual drive. However, at this timing, when a driver puts his/her foot on an accelerator pedal, a pedal position may be not fixed due to a reaction force from a pedal module, and a vehicle speed may become unstable when being switched to the manual drive from the automatic drive.

It is an object of the present disclosure to provide an accelerator device capable of appropriately switching from an automatic drive to a manual drive.

Hereinafter, an accelerator device according to the present disclosure will be described with reference to the drawings. In the following plural embodiments, substantially same structural configurations or functions are designated with the same reference numerals so as to simplify the description.

First Embodiment

The first embodiment is shown in FIGS. 1 to 7. As shown in FIG. 1, an accelerator device 1 is configured to be attached to a floor panel (not shown) forming a part of a vehicle body of a vehicle. The accelerator device 1 includes a case 10, a pedal lever 20, a motor 40 serving as an actuator, a power transmission mechanism 50 as a reaction force adjuster, and the like. The case 10 can be attached to the vehicle body, and accommodates an internal movable mechanism such as a pedal 35 therein and the like. FIG. 1 shows a state in which a cover (not shown) provided on a front side of the case 10 on the paper surface in FIG. 1 is removed. The hatching part in FIG. 1 shows a cross section of the case 10 to be covered by the cover.

The pedal lever 20 includes a pad 21, an arm 31, and a pedal 35, and is integrally driven by a driver's stepping operation or the like. Specifically, the pad 21 is provided to be operable by a driver's stepping operation (i.e., driver's depressing operation). The pad 21 is rotatably supported on the case 10 by a fulcrum member 23 provided on the case 10. The pedal lever 20 of the present embodiment is of a so-called "floor type" in which the pad 21 is provided to extend along one surface of the case 10. A wall portion of the case 10 facing the pad 21 is referred to as a top wall portion 11. Aside guard 24 is a member that guards a gap between the pad 21 and the case 10 so that the foot of the driver is not caught by the gap between the pad 21 and the case 10.

The arm 31 couples the pad 21 and the pedal 35. An opening through which the arm 31 is inserted is formed in the top wall portion 11 of the case 10. The opening through which the arm 31 is inserted is formed so as not to interfere with the arm 31 in an entire range of pedal operation.

The pedal 35 is housed in an internal space of the case 10, and includes a shaft portion 351 and a connecting portion 352. The shaft portion 351 is rotatably supported by the case 10. The connecting portion 352 is formed to extend from the shaft portion 351 so as to generally follow the top wall portion 11. An opposite end of the connecting portion 352 opposite to the shaft portion 351 engages with the arm 31. With such an arrangement, the pad 21, the arm 31, and the pedal 35 are integrally driven by an operation of the pad 21 in response to an operation of the driver.

A pedal biasing member 37 is made of a compression coil spring having one end fixed to the pedal 35 and the other end fixed to the case 10 to bias the pedal 35 toward the top wall portion 11. When the pad 21 is not depressed by the driver, the arm 31 comes into contact with a full-close stopper 17 that is formed at the top wall portion 11 inside the top wall portion 11. Further, when the pad 21 is depressed by a driver's operation, the pad 21 comes into contact with a full-open stopper (not shown) formed at the top wall portion 11 outside the top wall portion 11.

An accelerator opening degree sensor 39 generates an accelerator opening degree signal corresponding to a rotation angle of the shaft portion 351. The accelerator opening degree sensor 39 has, for example, a detection circuit including a Hall element that detects an orientation of a permanent magnet embedded in the shaft portion 351. As the accelerator opening degree sensor 39, any sensor other than the Hall element may be used as long as it can detect the accelerator opening degree. The accelerator opening degree signal is output to an ECU 60 via a connector (not shown).

The motor 40 is, for example, a DC brushless motor, and is provided on an opposite side of the case 10 from the fulcrum member 23. The ECU 60 controls operation of the motor 40 based on detection values of the accelerator opening degree sensor 39 and the position sensor 49, or the like. The driving force of the motor 40 is transmitted to the pedal lever 20 via the power transmission mechanism 50. Thereby, the pedal lever 20 is driven by the driving force of the motor 40. By providing the power transmission mechanism 50, the accelerator device 1 of the present embodiment is configured to be capable of actively driving the pedal lever 20 in an accelerator closing direction (hereinafter referred to as a "return direction" as appropriate) by the driving force of the motor 40. Further, an accelerator opening direction of the accelerator pedal is appropriately referred to as a "stepping direction (i.e., depressing direction)."

The power transmission mechanism 50 includes a feed screw 51, a holder 52, a rod 53, a reaction force adjustment biasing member 54, and the like. The feed screw 51, the holder 52 and the reaction force adjustment biasing member 54 are housed in a housing 55. The housing 55 is formed in a substantially cylindrical shape, and is provided adjacent to or integrally with one side of the case 10 opposite to a side on which the fulcrum member 23 is provided. The motor 40 is provided on one side of the housing 55 opposite to the pad 21.

A motor shaft insertion hole 551 through which a motor shaft is inserted is formed on one surface of the housing 55 facing the motor 40. Further, a rod insertion hole 552 through which a shaft portion 532 of the rod 53 is inserted is formed on a pad-side surface of the housing 55. A position sensor 49 that detects a position of the holder 52 is provided in the housing 55.

The feed screw 51 is a male screw and is rotationally driven by the motor 40. The holder 52 is formed in a substantially bottomed cylindrical shape that opens on a side of a rod 53. A female screw portion 521 that meshes with the feed screw 51 is formed at the bottom of the holder 52. The rotation of the feed screw 51 by the motor 40 allows the holder 52 to move in an axial direction of the feed screw 51. A stopper portion 522 that can come into contact with the rod 53 is formed on the holder 52 to face the rod 53. The feed screw 51 may be a female thread, and the holder 52 may be provided with a male screw.

The rod 53 has a top portion 531 and a shaft portion 532, and is formed in a substantially T shape when viewed from one side. The top portion 531 is accommodated in the housing 55, and the shaft portion 532 protrudes from the rod insertion hole 552 toward the pad 21. A tip of the shaft portion 532 is formed in an arc shape in a side view, and contacts the pad 21. The reaction force adjustment biasing member 54 is made of a compression coil spring having one end housed inside the holder 52 and the other end coming into contact with the top portion 531 of the rod 53.

In an initial state in which the accelerator is fully closed, the top portion 531 of the rod 53 is pressed against a pad-side end surface of the housing 55 by the reaction force adjustment biasing member 54. Further, in the initial state, the holder 52 is positioned closer to the motor 40, relatively.

When the pad 21 is stepped and depressed, the rod 53 moves toward the holder 52 due to a pedaling force. Further, when the motor 40 is driven to drive the holder 52 toward the rod 53, a reaction force can be applied in the return direction of the pedal lever 20 as a biasing force from the reaction force adjustment biasing member 54. The ECU 60 can adjust the reaction force applied to the pedal lever 20 by controlling the drive of the motor 40 and controlling a position of the holder 52 based on the detection value of the position sensor 49.

Further, when the motor 40 is driven in an accelerator fully-closed state and the holder 52 is driven to a position where the stopper portion 522 abuts to the top portion 531 of the rod 53, the pedal lever 20 is locked. In the present embodiment, the feed screw 51 and the holder 52 are in a bolt and nut relationship, so the holder 52 is held at a position where a power supply to the motor 40 is turned off. That is, even when an electric power to the motor 40 is turned off while the holder 52 and the rod 53 are in contact with each other and the pad 21 is depressed by the driver in such a state, the holder 52 will not be pushed back and the locked state of the pedal lever 20 will be maintained. Further, by driving the motor 40 in a reverse direction to separate the holder 52 and the rod 53 from each other, the locked state is released. In such manner, the pedal lever 20 can be fixed when the accelerator operation is unnecessary, such as in an automatic drive time.

The ECU 60 is made of various components, among which a microcomputer serves as a main component, and includes therein a CPU, a ROM, a RAM, an I/O (none of which are shown), and a bus line connecting these components. Each process executed by the ECU 60 may be a software process, which may be implemented by causing a CPU to execute a program stored beforehand in a tangible memory device such as a ROM, that is, in a non-transitory, tangible storage medium readable by a computer, or may be a hardware process, which may be implemented by a dedicated electronic circuit.

The ECU 60 has, as functional blocks, an accelerator opening degree detection unit 61, a target operation amount setting unit 62, a holder position detection unit 63, a drive control unit 65, a notification control unit 67, and the like. The accelerator opening degree detection unit 61 detects an accelerator opening degree A based on the detection value of the accelerator opening degree sensor 39. A target operation amount setting unit 62 sets a target accelerator opening degree $A^*$. The holder position detection unit 63 detects a holder position H based on the detection value of the position sensor 49. The drive control unit 65 controls drive of the motor 40. Also, the ECU 60 acquires a vehicle speed Vs based on the detection value of a vehicle speed sensor 75. The notification control unit 67 instructs a notification device 70 to provide information to be notified to the driver.

The notification device 70 has a display device 71 such as a display and a speaker 72, and is configured to notify the driver of information indicating switching between automatic drive and manual drive, information related to the accelerator opening degree A, and the like.

Figure 2:
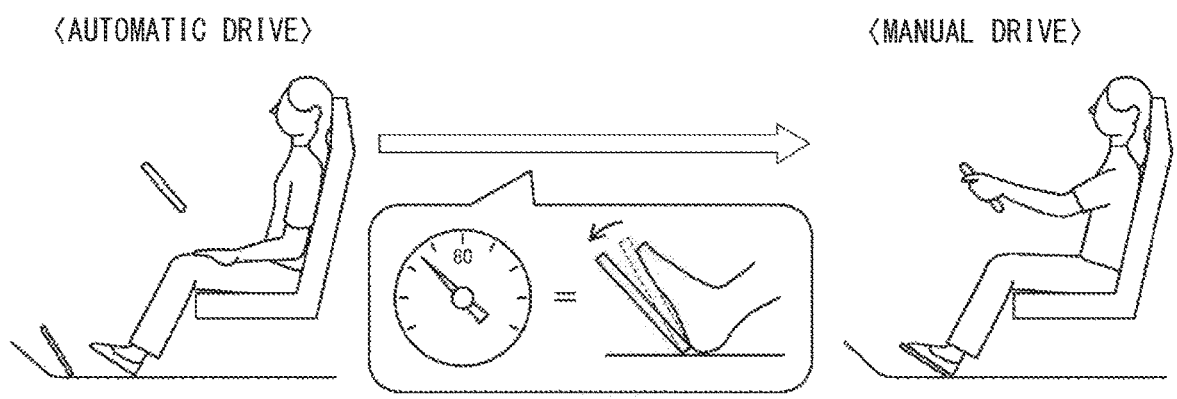
FIG. 2 is an explanatory diagram for explaining a switching from an automatic drive to a manual drive according to the first embodiment.

As shown in FIG. 2, during automatic drive, the vehicle speed Vs is controlled regardless of the accelerator opening degree A, so the driver does not need to operate the pedal lever 20. On the other hand, in manual drive, vehicle speed control such as engine control according to the accelerator opening degree A is performed. Therefore, when switching from the automatic drive to the manual drive during a travel of the vehicle, it is desirable to start manual drive after adjusting the pedal position so that the accelerator opening degree A is adjusted according to the vehicle speed.

Figure 3A:
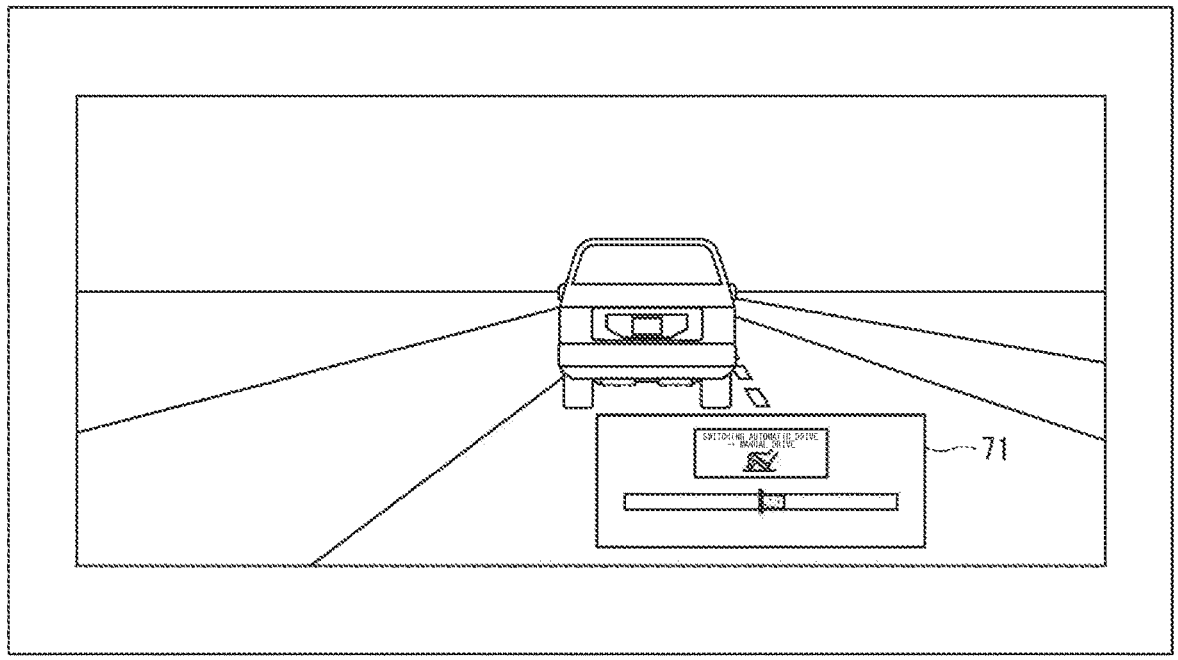
FIG. 3A is a diagram showing an example of a display state of a display device according to the first embodiment.
Figure 3B:
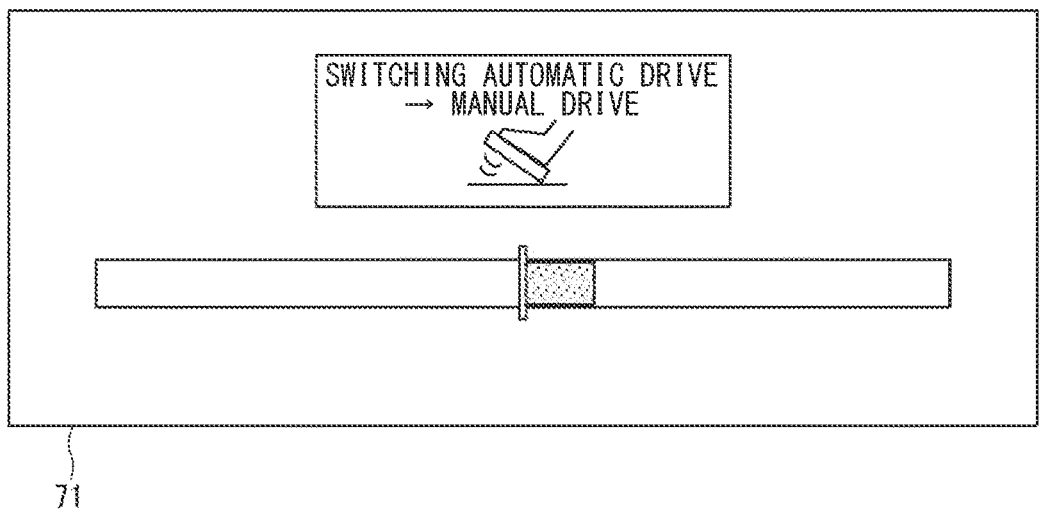
FIG. 3B is an enlarged view showing the display state of the display device shown in FIG. 3A.

In the present embodiment, for example, as shown in FIGS. 3A and 3B, the driver is prompted to perform a pedal operation by displaying, on the display device 71, information regarding switching from the automatic drive to the manual drive, and by displaying a current accelerator opening degree A and a target accelerator opening degree $A^*$. The accelerator opening degree A and the target accelerator opening degree $A^*$ can be displayed, for example, as a square display as shown in FIG. 4A, as a circular display as shown in FIG. 4B, as a monotonically increasing display as shown in FIG. 4C and the like. Also, as shown in FIG. 4D, it may be displayed in numbers. In case of displaying the accelerator opening degree in numbers, instead of using a percentage notation, an opening degree [deg.] of the accelerator may also be displayed. As long as notifying the driver of the contents about the information of switching from the automatic drive to the manual drive and about prompting the pedal operation by the driver, the notification method may be a method other than the ones shown in FIGS. 4A to 4D. For example, the contents of notification may be a voice guidance from the speaker 72, or may be both of the screen display by the display device 71 and the voice guidance from the speaker 72.

When switching from the automatic drive to the manual drive, if the reaction force is not adjusted, the reaction force will immediately be applied at the time of switching to the manual drive even when the pedal position is adjusted. In such case, if the driver is simply putting his/her foot on the pedal, the pedal position may be not fixed due to the reaction force, and the vehicle speed Vs may become unstable.

Therefore, in the present embodiment, the switching operation to the manual drive is performed after adjusting the reaction force by using the motor 40 and the power transmission mechanism 50, and by guiding the driver to the pedal position corresponding to the vehicle speed Vs, thereby stabilizing the pedal position. In such manner, sudden changes in the vehicle speed are preventable, and smooth switching of drive modes is realized.

Figure 5:
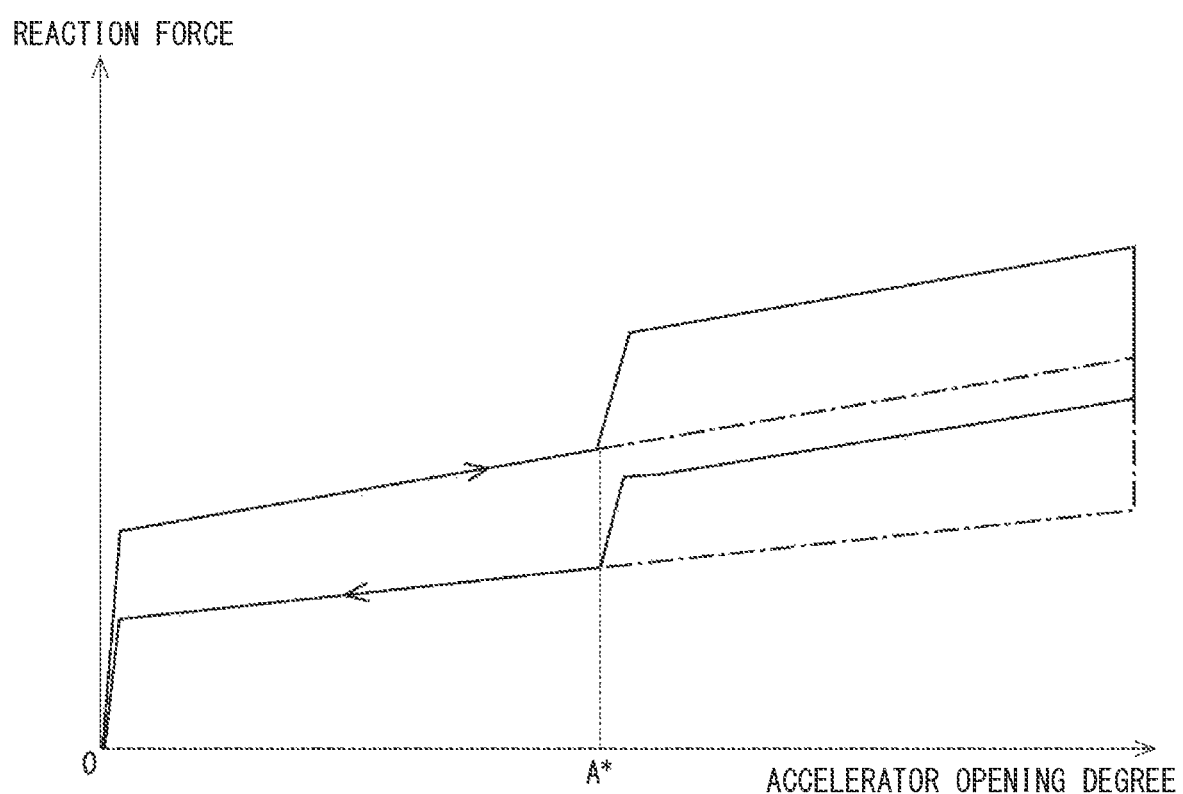
FIG. 5 is a characteristic diagram for explaining reaction force characteristics according to the first embodiment.
Figure 9:
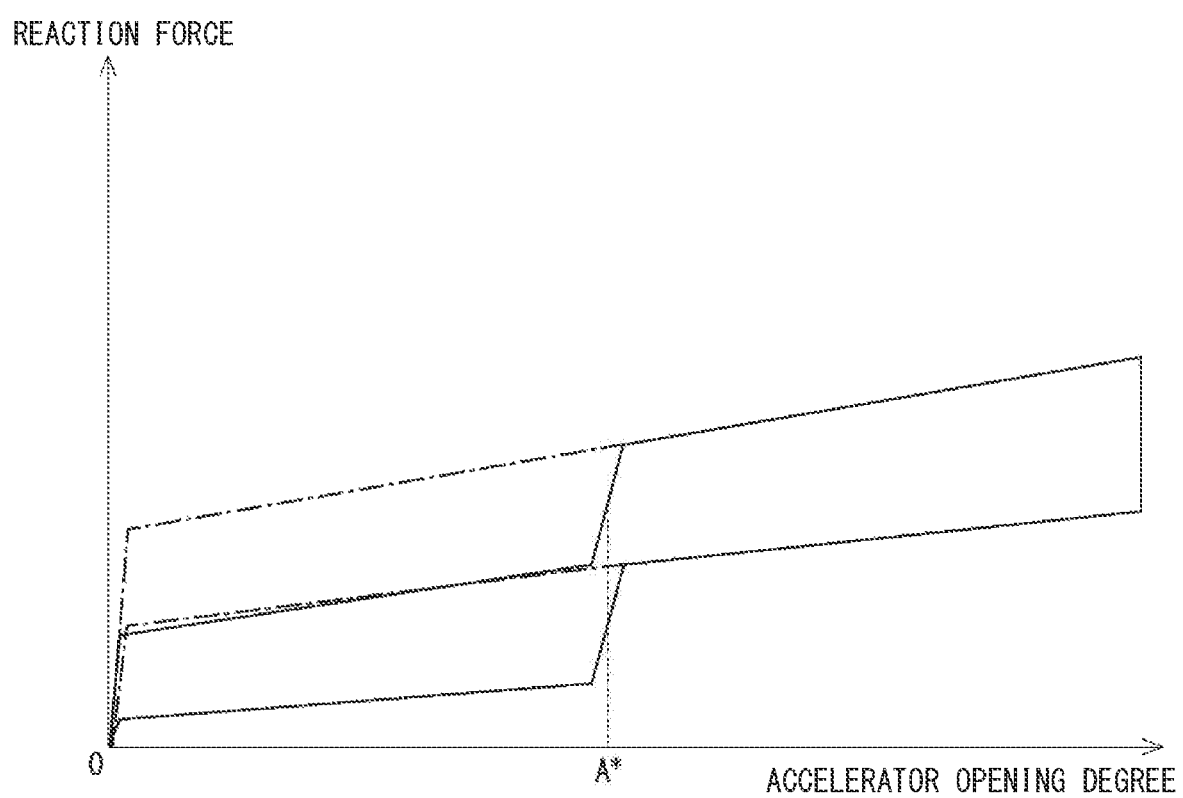
FIG. 9 is a characteristic diagram for explaining reaction force characteristics when a reaction force is reduced according to a third embodiment.
Figure 10:
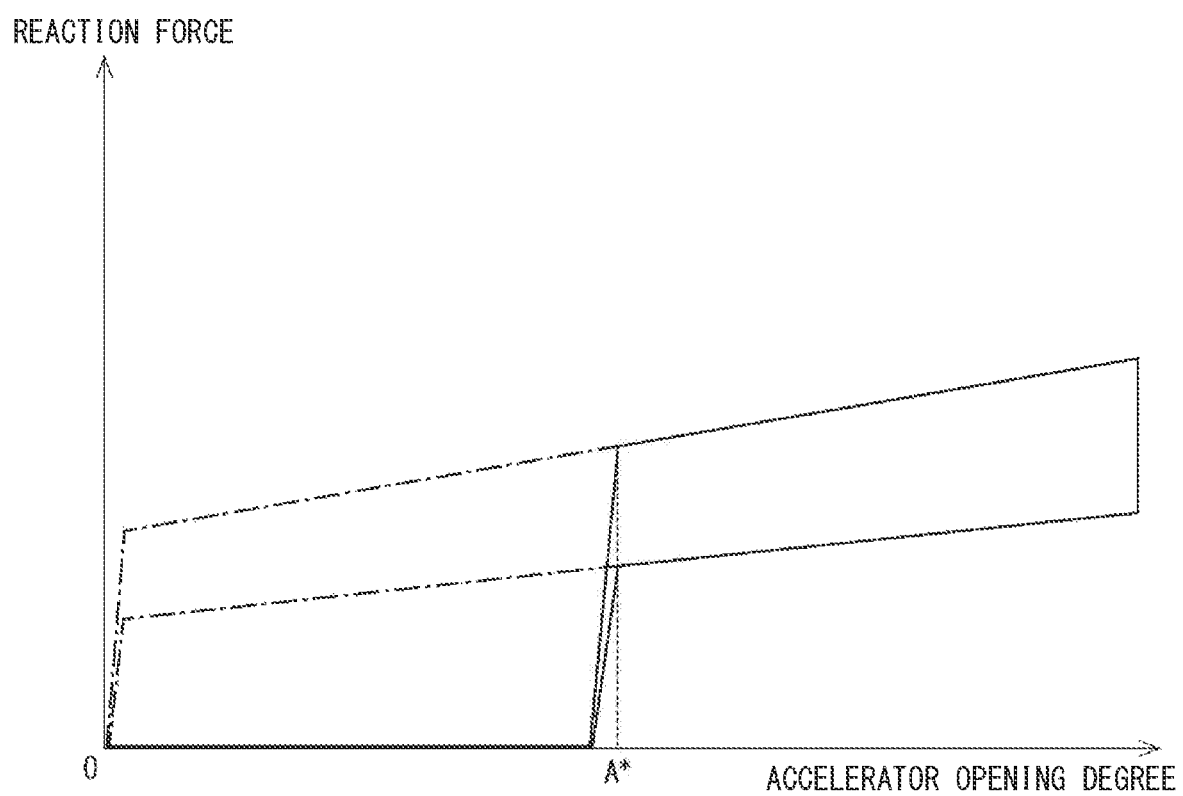
FIG. 10 is a characteristic diagram for explaining another reaction force characteristics when the reaction force is reduced according to the third embodiment.

FIG. 5 shows reaction force characteristics. In FIG. 5, the horizontal axis shows the accelerator opening degree A, and the vertical axis shows the reaction force. Also, a one-dot chain line indicates the reaction force characteristics when the reaction force is not applied via the power transmission mechanism 50. FIGS. 9 and 10 are the same as FIG. 5.

As shown in FIG. 5, the reaction force is applied in a region where the accelerator opening degree A is equal to or greater than the target accelerator opening degree $A^*$ corresponding to the vehicle speed Vs. An additional reaction force F additionally applied here is set to such an extent that it gives the driver a sense of wall, or wall feel. In the present embodiment, a reaction force in the accelerator closing direction is applied to the pedal lever 20, by moving the holder 52 closer to the pad 21 and by compressing the reaction force adjustment biasing member 54. In such manner, the driver gets a wall feel at the target accelerator opening degree $A^*$, and can be induced to hold the pedal lever 20 at such position.

Figure 6:
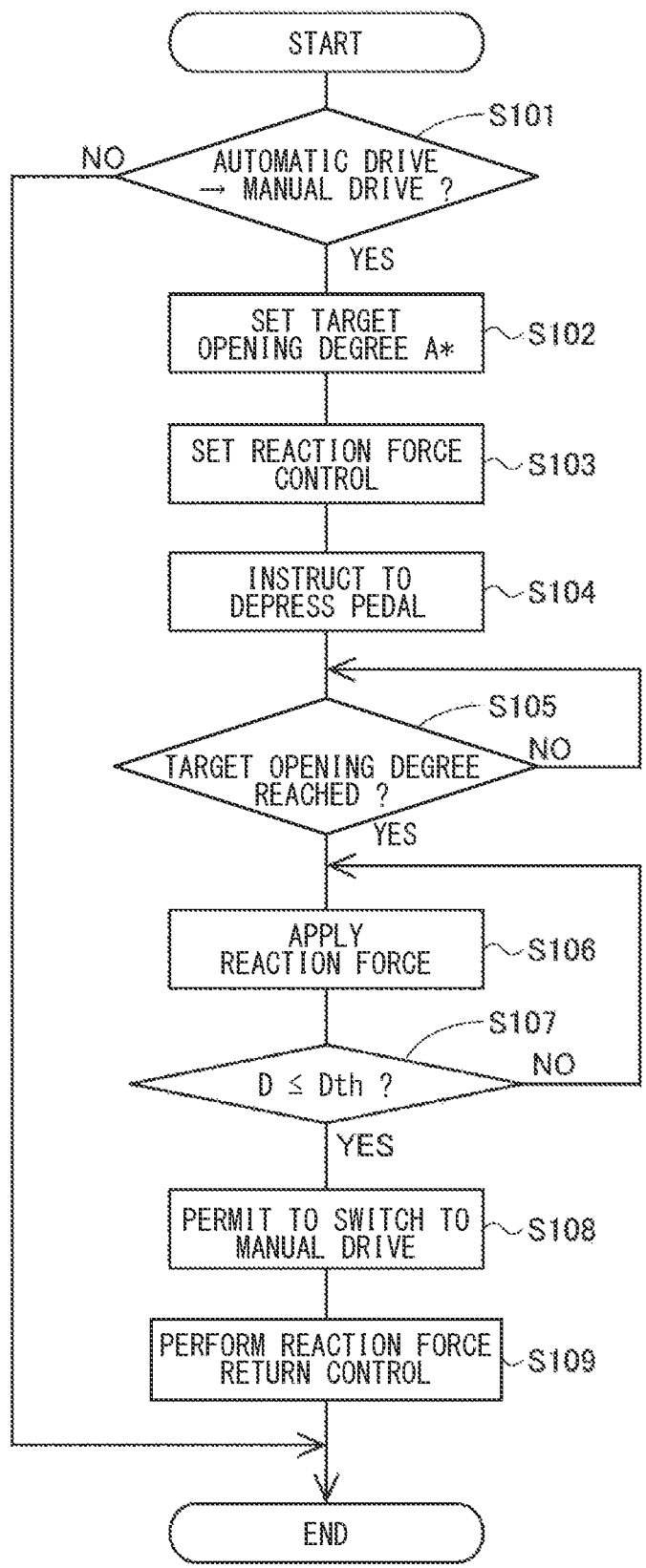
FIG. 6 is a flowchart for explaining a reaction force control process according to the first embodiment.

A reaction force control process of the present embodiment will be described based on the flowchart of FIG. 6. This process is executed by the ECU 60 at a predetermined cycle. Hereinafter, each step in the following process is simply indicated as a symbol S. The same applies to the other steps.

In S101, the ECU 60 determines whether or not an instruction to switch from the automatic drive to the manual drive has been detected. If it is determined that an instruction for switching from the automatic drive to the manual drive is not detected (S101: NO), the process of S102 and thereafter is skipped. If it is determined that an instruction to switch from the automatic drive to the manual drive is detected (S101: YES), the process proceeds to S102.

In S102, the target operation amount setting unit 62 searches table data based on a current vehicle speed Vs, a current acceleration, a current throttle opening degree, and the like, and sets a target accelerator opening degree $A^*$. In S103, the ECU 60 sets reaction force characteristics based on the set target accelerator opening degree $A^*$ (see FIG. 5).

Figure 14A:
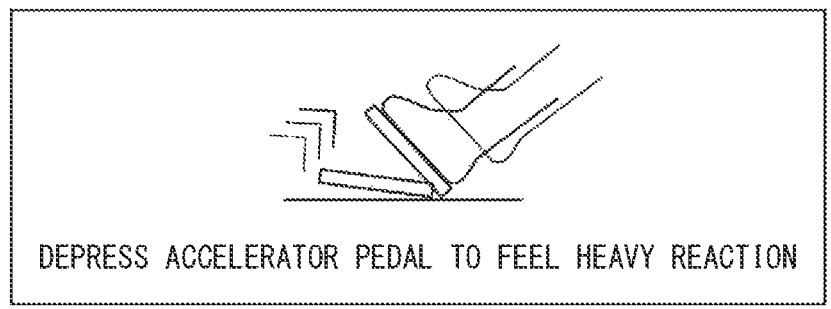
FIG. 14A is a diagram showing a display example of a display device according to the third embodiment.
Figure 14B:
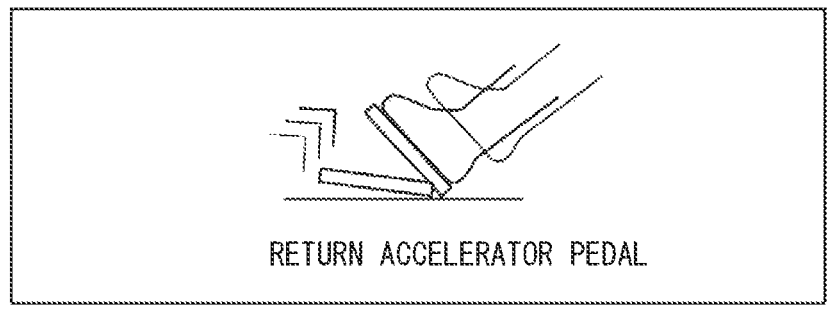
FIG. 14B is a diagram showing another display example of the display device according to the third embodiment.

In S104, the ECU 60 displays information indicating switching information from the automatic drive to the manual drive and information related to the accelerator opening degree A on the display device 71, and prompts the user to operate the pedal (see FIGS. 4A to 4D). In addition to the above, the notification device 70 may notify direct information to the user, for prompting the pedal operation by the user, such as "depress the pedal to feel heavy reaction" (see FIG. 14A).

In S105, the ECU 60 determines whether or not the accelerator opening degree A has reached the target accelerator opening degree $A^*$. Here, when the accelerator opening degree A is within a predetermined target range Ra including the target accelerator opening degree $A^*$, affirmative determination is made. Hereinafter, a lower limit value of the target range Ra including the target accelerator opening degree A* is defined as an allowable lower limit value A*min, and an upper limit value thereof is defined as an allowable upper limit value A*_max. If it is determined that the accelerator opening degree A has not yet reached the target accelerator opening degree A* (S105: NO), the determination process of S105 is repeated. When it is determined that the accelerator opening degree A has reached the target accelerator opening degree A* (S105: YES), the process proceeds to S106. In S106, the drive control unit 65 drives the motor 40 to move the holder 52 to a predetermined wall feel application position H1, thereby applying a reaction force.

In S107, the ECU 60 determines whether or not a depression speed D of the pedal lever 20 is equal to or less than a determination threshold value Dth. Here, it is determined whether or not the pedal position is stable based on the depression speed D, and the determination threshold value Dth is set to a value close to 0 that enables determination of whether or not the pedal position is stable. If it is determined that the depression speed D is greater than the determination threshold value Dth (S107: NO), the process returns to S106 to continue application of the reaction force. If it is determined that the depression speed D is equal to or less than the determination threshold value Dth (S107: YES), the process proceeds to S108. In the present embodiment, if a state where the depression speed D (i.e., stepping speed) is equal to or lower than the determination threshold value Dth continues for a predetermined time Xth, affirmative determination is made.

In S108, the ECU 60 permits switching to the manual drive. Specifically, a control using the accelerator opening degree A is permitted, and an engine control using the accelerator opening degree A or the like is started. In S109, the drive control unit 65 performs a reaction force return control for driving the motor 40. In the reaction force return control, a load reduction control for gradually reducing the reaction force is performed by a feedback control of the holder position H based on a reaction force difference, which is a difference between the current reaction force and a reaction force at a time without having reaction force application, the vehicle speed, and the like, in consideration of the driver's feel of when depressing the pedal. When the holder 52 returns to the initial position and the motor 40 is stopped, the reaction force return control is complete and a normal reaction force is applied.

Figure 7:
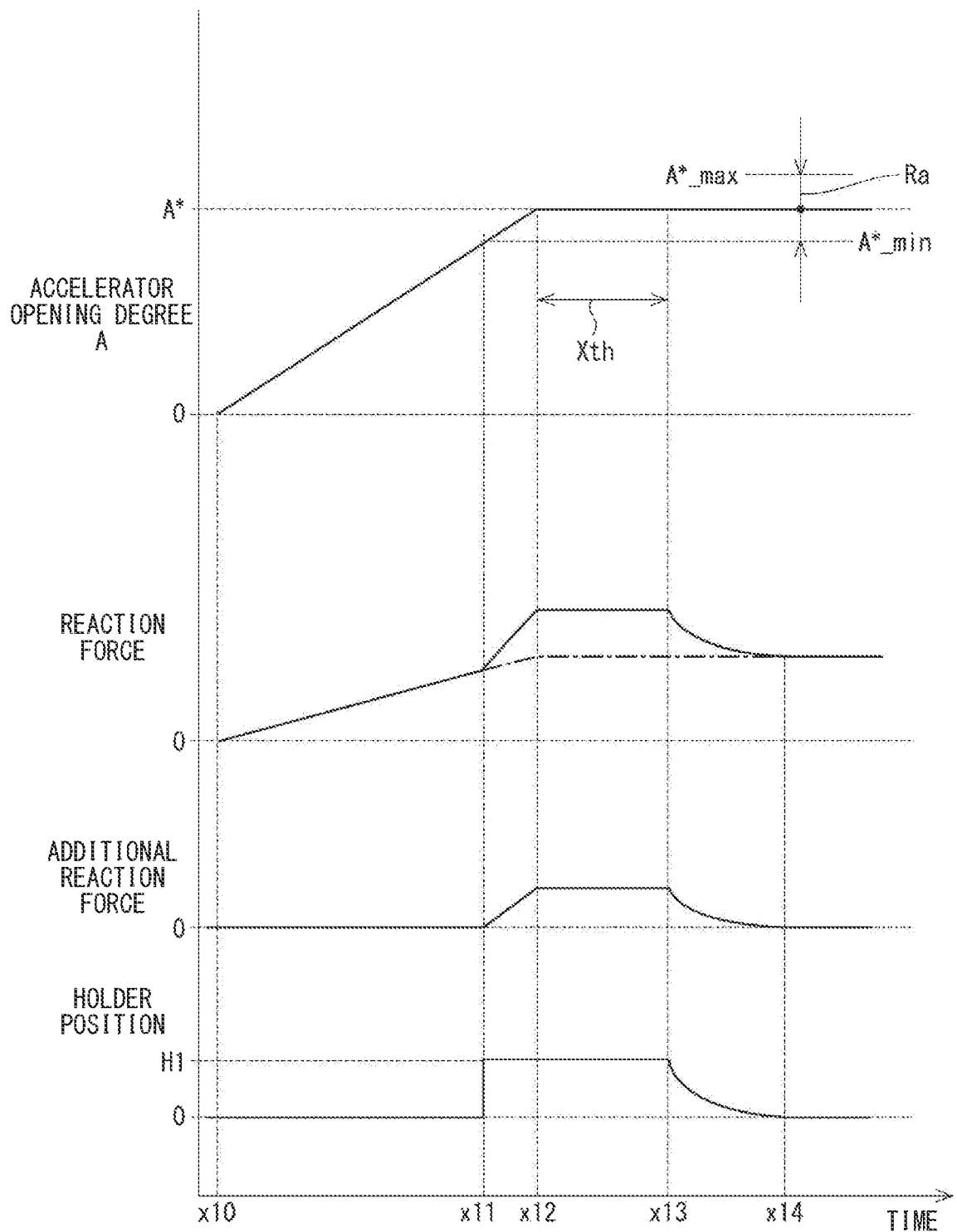
FIG. 7 is a time chart for explaining the reaction force control process according to the first embodiment.

The reaction force control process of the present embodiment will be described based on the time chart of FIG. 7. In FIG. 7, the horizontal axis shows a common time axis, and the accelerator opening degree A, the reaction force, the additional reaction force, and the holder position are shown from the top. Regarding the reaction force, a solid line indicates a case where the reaction force control is performed, and a one-dot chain line indicates a case where no reaction force control is performed. Further, regarding the holder position, it is defined that an initial position is 0, an amount of movement of the holder 52 moving toward the pad 21 is positive, and an amount of movement away from the pad 21 is negative. The same applies to the time chart according to the embodiments described later.

At time x10, when switching from the automatic drive to the manual drive is detected, the driver steps and depresses the pedal lever 20. At time x11, when the accelerator opening degree A reaches the allowable lower limit value A*_min, the motor 40 is driven to move the holder 52 to the wall feel application position H1 for applying a reaction force. In such manner, by giving the wall feel to the driver, depression of the pedal by the driver can be suppressed.

At time x12, the accelerator opening degree A stabilizes within the target range Ra including the target accelerator opening degree A*. Further, at time x13 that is time later from time x12 by a predetermined time Xth during which the depression speed D remains equal to or lower than the determination threshold value Dth, the switching operation to the manual drive is allowed, and the reaction force return control is started. In the reaction force return control, the reaction force is gradually reduced for the reduction of the reaction force. At time x14, when the holder 52 returns to the initial position and the additional reaction force becomes 0, the reaction force applied to the pedal lever 20 returns to normal.

As described above, the accelerator device 1 of the present embodiment includes the pedal lever 20, the power transmission mechanism 50, and the ECU 60. The pedal lever 20 operates according to the depression operation. The power transmission mechanism 50 is driven by the motor 40 and can adjust the reaction force, which is the force in the direction of pushing back the pedal lever 20.

The ECU 60 includes the target operation amount setting unit 62 and the drive control unit 65. The target operation amount setting unit 62 sets the target accelerator opening degree A*, which is the accelerator opening degree A corresponding to the vehicle speed. The drive control unit 65 controls the drive operation of the motor 40. The ECU 60 controls the reaction force in accordance with the target accelerator opening degree A* so that the accelerator opening degree A falls within the target range Ra when the automatic drive is switched to the manual drive. By controlling the reaction force so that the accelerator opening degree A is within the target range Ra, it is possible to suppress fluctuations in the vehicle speed Vs when switching from the automatic drive to the manual drive, thereby enabling an appropriate switching from the automatic drive to the manual drive.

When the accelerator opening degree A reaches the target range Ra, the ECU 60 controls the power transmission mechanism 50 so that the reaction force becomes relatively larger than before reaching the target range Ra. The reaction force application position can be set at any position within the target range Ra. The same applies to embodiments described later. By increasing the reaction force in the target range Ra, excessive depression of the pedal lever 20 can be reduced since the driver gets a wall feel.

When the accelerator opening degree A is stabilized within the target range, the ECU 60 performs the reaction force return control to return the reaction force to the initial state by gradually changing the reaction force. Further, the ECU 60 permits switching from the automatic drive to the manual drive when the accelerator opening degree A is stabilized within the target range Ra. In such manner, the driver's sense of discomfort is suppressible, and an appropriate switching from the automatic drive to the manual drive can be performed.

The ECU 60 includes the notification control unit 67 that causes the notification device 70 to notify the driver of information related to the target accelerator opening degree A*. The notification control unit 67 causes the notification device 70 to notify the driver of an operation instruction regarding an operation direction of the pedal lever 20. In such manner, the operation state of the pedal lever 20 is readily notified to the driver in an easy-to-understand manner, thereby reducing a driver's mental load.

Second Embodiment

Figure 8:
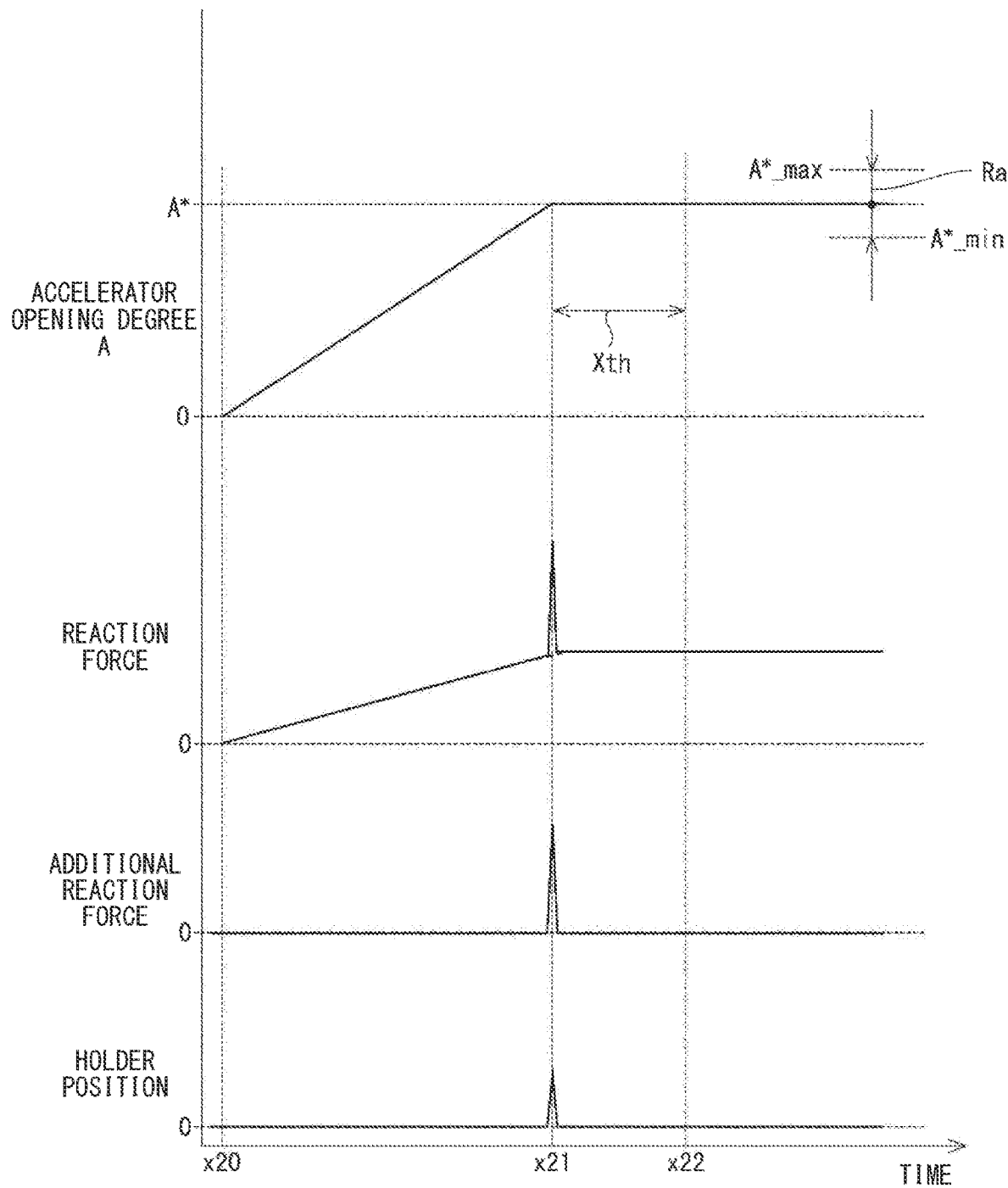
FIG. 8 is a time chart for explaining a reaction force control process according to a second embodiment.

The second embodiment will be described based on the time chart of FIG. 8. At time x20, when switching from an automatic drive to a manual drive is detected, the driver steps and depresses the pedal lever 20. At time x21, when the accelerator opening degree A reaches the target accelerator opening degree A*, the motor 40 is driven to apply a pulse-like reaction force. This makes it possible for the driver to sense that the accelerator opening degree A has reached the target accelerator opening degree A*. Here, it is described that one pulse reaction force is applied, but the number of pulses may also be plural.

At time x22 when the accelerator opening degree A is stabilized within the target range Ra of the target accelerator opening degree A* and a state where the depressing speed (i.e., stepping speed) is equal to or lower than the determination threshold has continued at least for a predetermined time Xth, the switching to the manual drive is permitted.

In the present embodiment, the ECU 60 generates a pulse-like reaction force at least once when the accelerator opening degree A reaches the target range Ra. In such manner, the driver can sense through the pedal lever 20 that the accelerator opening degree A has reached the target range Ra. The second embodiment also provides the same advantages as the first embodiment.

Third Embodiment

The third embodiment is shown in FIGS. 9 to 14B. In the above-described first embodiment, the accelerator opening degree A is maintained at the target accelerator opening degree A* by applying a reaction force at the target accelerator opening degree A* to give a wall feel. In the present embodiment, when the driver depresses the pedal lever 20 deeper than the target accelerator opening degree A*, a pedal return control is performed so that the reaction force is increased to be greater than the reaction force at the wall feel application time, to push back the pedal lever 20 and to guide the opening degree to the target acceleration opening degree A*. In such pedal return control, by moving the holder 52 to a push-back position H2, which is closer to the pad 21 than the wall feel application position H1, the pedal lever 20 receives a greater reaction force than that at the wall feel application time.

On the other hand, when the accelerator opening degree A does not reach the target accelerator opening degree A*, as shown in FIG. 9, a deeper stepping of the pedal lever 20 by the driver is induced by weakening the reaction force in a region where the accelerator opening degree A is smaller than the target accelerator opening degree A*. In such case, the reaction force to the pedal lever 20 is reduced by moving the holder 52 to a reaction force reduction position H3 further away from the pad 21 than the initial position and by extending the reaction force adjustment biasing member 54. Further, as shown in FIG. 10, the reaction force may be controlled to be zero in a region where the accelerator opening degree A is smaller than the target accelerator opening degree A*.

Figure 11:
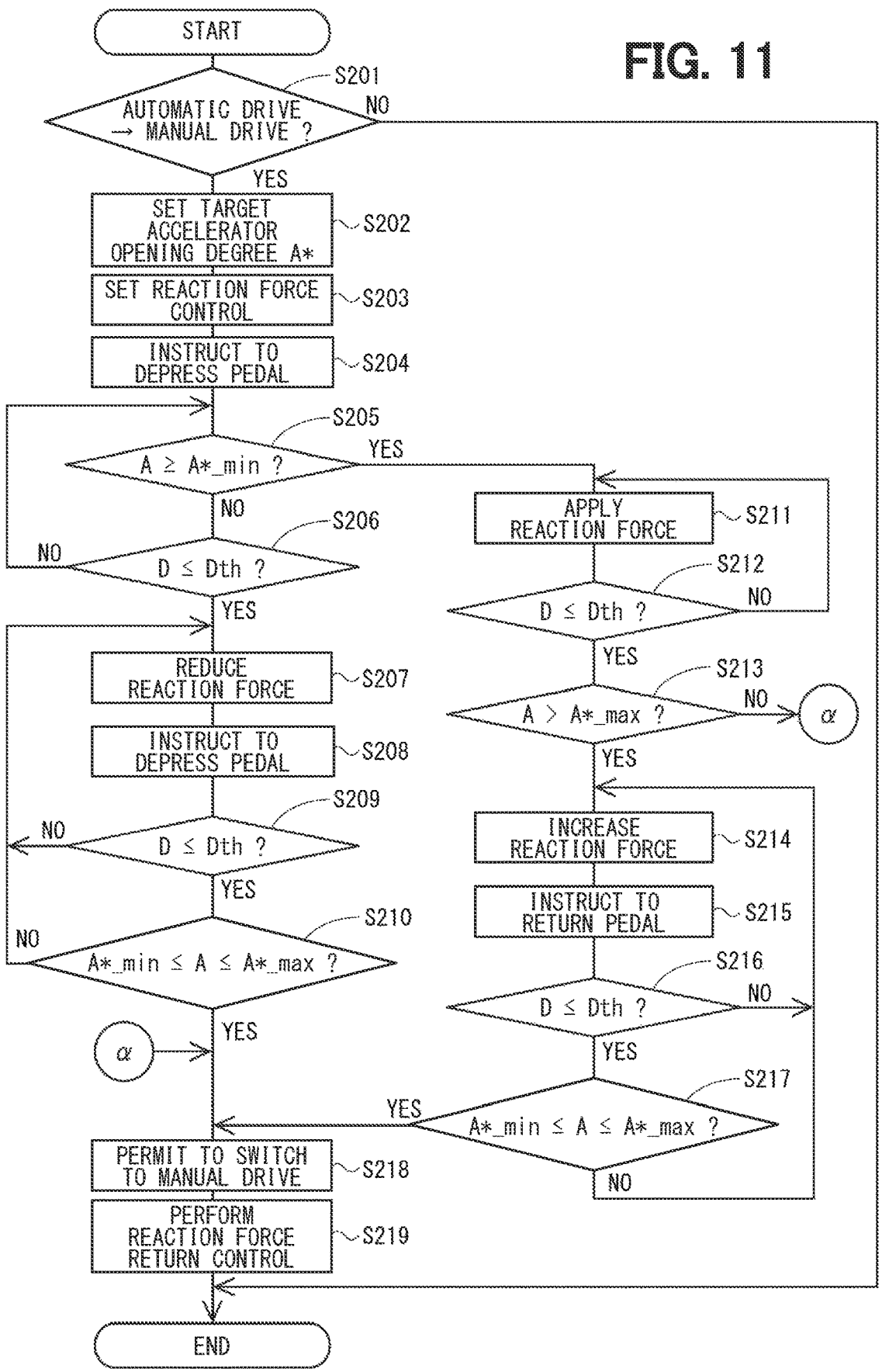
FIG. 11 is a flowchart for explaining a reaction force control process according to the third embodiment.

The reaction force control process of the present embodiment will be described based on the flowchart of FIG. 11. The process of S201 to S204 is the same as the process of S101-S104 in FIG. 6, respectively.

In S205, the ECU 60 determines whether or not the accelerator opening degree A is equal to or greater than an allowable lower limit value A*_min. If it is determined that the accelerator opening degree A is equal to or greater than the allowable lower limit value A*_min (S205: YES), the process proceeds to S211. If it is determined that the accelerator opening degree A is smaller than the allowable lower limit value A*_min (S205: NO), the process proceeds to S206.

The process of S206 is the same as that of S107, and the ECU 60 determines whether or not the depression speed D (i.e., stepping speed) is equal to or less than the determination threshold value Dth. If it is determined that the depression speed D is greater than the determination threshold value Dth (S206: NO), the process returns to S205. If it is determined that the depression speed D is equal to or less than the determination threshold value Dth (S206: YES), the process proceeds to S207. As in the above-described embodiment, if the state where the depression speed D is equal to or less than the determination threshold value Dth continues at least for a predetermined time Xth, affirmative determination is made. The same applies to S209, S212, and S216. Note that the determination time may be the same or different in each of the above-mentioned steps S209, S212, and S216.

In S207, the ECU 60 reduces the reaction force by driving the motor 40 and moving the holder 52 to the predetermined reaction force reduction position H3. In S208, the ECU 60 instructs the driver to steps and depress the pedal lever 20 through the notification device 70 (see FIG. 14A).

The process of S209 is the same as that of S206, and the ECU 60 determines whether or not the depression speed D is equal to or less than the determination threshold value Dth. The determination threshold Dth may be the same as or different from S206. The same applies to S212 and S216. If it is determined that the depression speed D is greater than the determination threshold value Dth (S209: NO), the process returns to S207 to continue reducing the reaction force. If it is determined that the depression speed D is equal to or less than the determination threshold value Dth (S209: YES), the process proceeds to S210.

In S210, the ECU 60 determines whether or not the accelerator opening degree A is within the target range Ra. Here, when the accelerator opening degree A is equal to or greater than the allowable lower limit value A*_min and equal to or less than the allowable upper limit value A*_max, it is determined that the accelerator opening degree A is within the target range Ra. If it is determined that the accelerator opening degree A is not within the target range Ra (S210: NO), the process returns to S207 to continue reducing the reaction force. If it is determined that the accelerator opening degree A is within the target range Ra (S210: YES), the process proceeds to S218.

The process of S211, which is subsequent to a determination in which it is determined that the accelerator opening degree A is equal to or greater than the allowable lower limit value A*_min (S205: YES), is the same as S106, in which a reaction force is applied by moving the holder 52 to the wall feel application position H1.

The process of S212 is the same as that of S206, and the ECU 60 determines whether or not the depression speed D is equal to or less than the determination threshold value Dth. If it is determined that the depression speed D is greater than the determination threshold value Dth (S212: NO), the process returns to S211 to continue applying the reaction force. If it is determined that the depression speed D is equal to or less than the determination threshold value Dth (S212: YES), the process proceeds to S213.

In S213, the ECU 60 determines whether or not the accelerator opening degree A is greater than the allowable upper limit value A*_max. If it is determined that the accelerator opening degree A is equal to or less than the allowable upper limit value A*_max (S213: NO), that is, if the accelerator opening degree A is within the target range Ra, the process proceeds to S218. If it is determined that the accelerator opening degree A is greater than the allowable upper limit value A*_max (S213: YES), the process proceeds to S214.

In S214, the ECU 60 drives the motor 40 to move the holder 52 to the push-back position H2, which is closer to the pad 21 than the wall feel application position H1, thereby increasing the reaction force of the pedal lever 20 in the closing direction. In S215, the ECU 60 instructs the driver to return the pedal lever 20 through the notification device 70 (see FIG. 14B).

The process of S216 is the same as that of S206, and the ECU 60 determines whether or not the depression speed D is equal to or less than the determination threshold value Dth. If it is determined that the depression speed D is greater than the determination threshold value Dth (S216: NO), the process returns to S214 to continue increasing the reaction force. If it is determined that the depression speed D is equal to or less than the determination threshold value Dth (S216: YES), the process proceeds to S217.

The process of S217 is the same as that of S210, and the ECU 60 determines whether or not the accelerator opening degree A is within the target range Ra. If it is determined that the accelerator opening degree A is not within the target range Ra (S217: NO), the process returns to S214 to continue increasing the reaction force. If it is determined that the accelerator opening degree A is within the target range Ra (S217: YES), the process proceeds to S218. The process of S218 is the same as the process of S108.

In S219, the ECU 60 performs the reaction force return control. The control operation when the holder 52 is at the wall feel application position H1 or the push-back position H2 is similar to the load reduction control in S109. When the holder 52 is at the reaction force reduction position H3, the movement direction of the holder 52 is opposite to that of S109, but the control process is generally the same.

Figure 12:
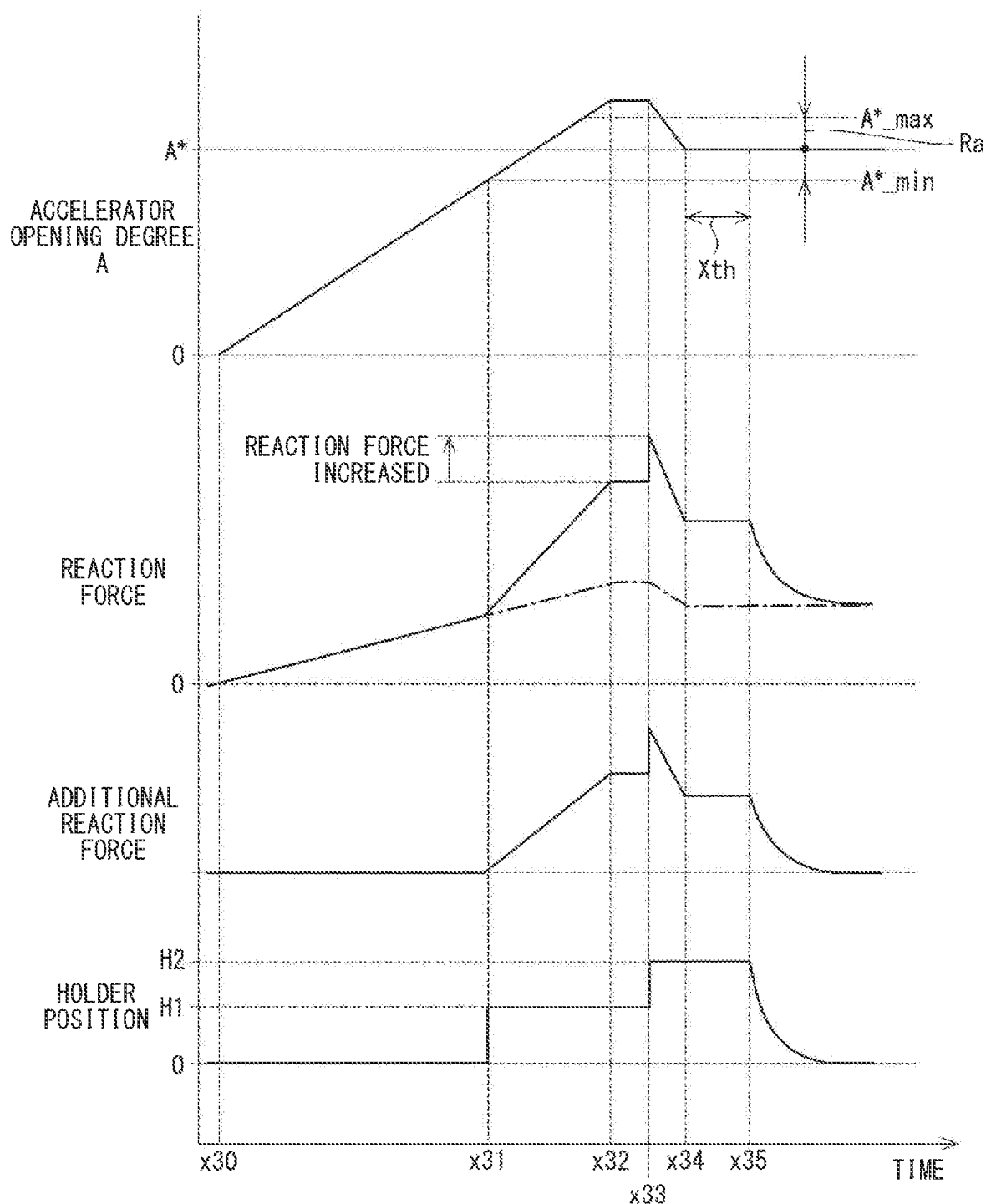
FIG. 12 is a time chart for explaining the reaction force control process according to the third embodiment.

The reaction force control process of the present embodiment will be described with reference to FIGS. 12 and 13. FIG. 12 shows a process when the driver steps and depresses the pedal lever 20 too much. The process from time x30 to time x31 is the same as the process from time x10 to time x11 in FIG. 7.

In a time period from time x32 to time x33, the accelerator opening degree A stabilizes, and the depression speed D becomes equal to or less than the determination threshold value Dth. Since the accelerator opening degree A at this time exceeds the allowable upper limit value A*_max, the holder 52 is moved to the push-back position H2 to increase the reaction force. From time x33 to time x34, the reaction force decreases as the driver returns the pedal lever 20. The process after time x34, in which the accelerator opening degree A is stable within the target range Ra including the target accelerator opening degree A*, is the same as the process after time x12 in FIG. 7. If the pedal lever 20 is returned too much due to an increase in the reaction force, the reaction force may be reduced by moving the holder 52 back to the initial position or to the reaction force reduction position H3.

Figure 13:
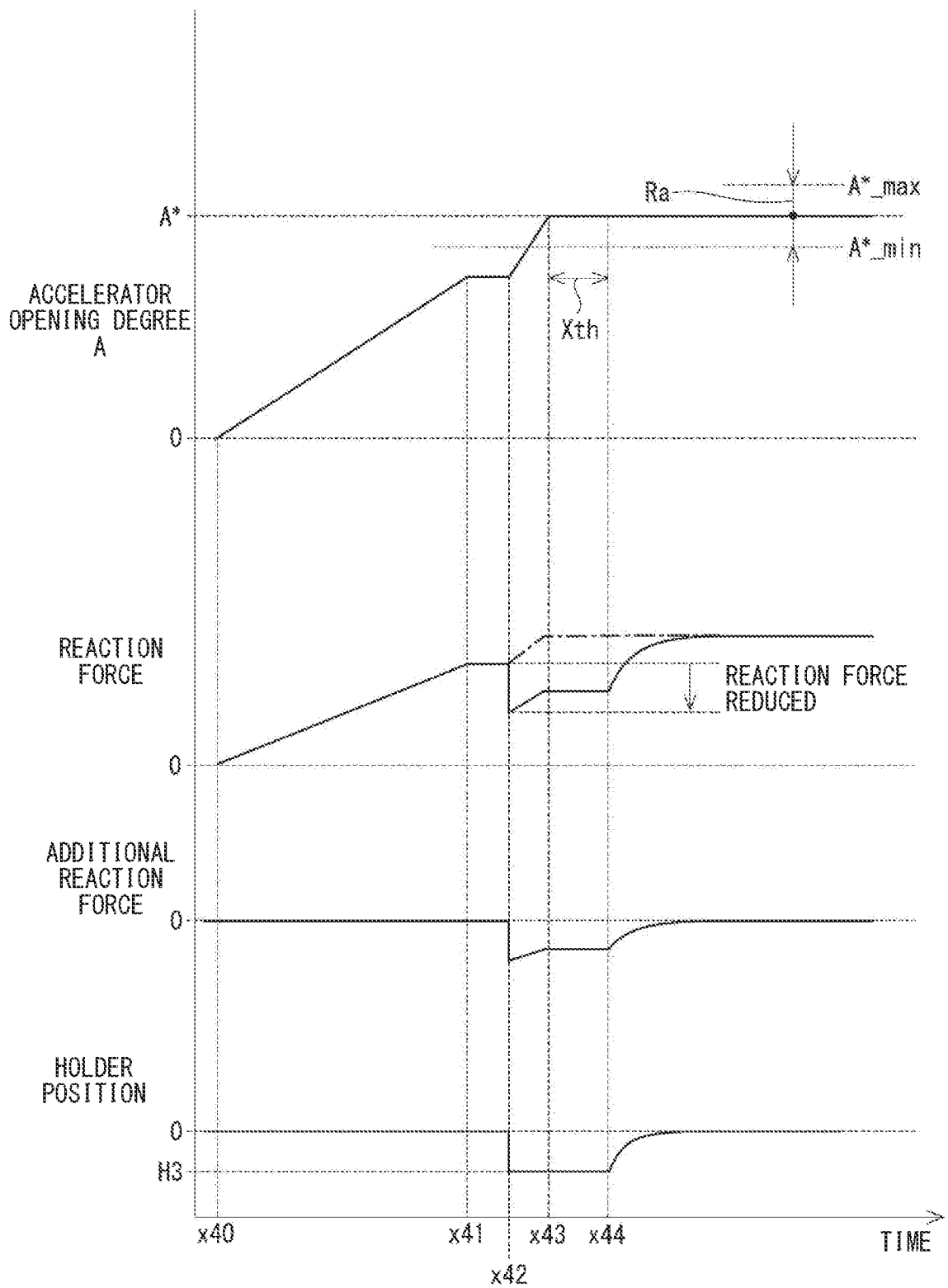
FIG. 13 is a time chart for explaining another reaction force control process according to the third embodiment.

FIG. 13 shows an example in which the driver does not fully depress the pedal lever 20. At time x40, when a switching operation from the automatic drive to the manual drive is detected, the driver steps and depresses the pedal lever 20. From time x41 to time x42, the accelerator opening degree A stabilizes, and the depression speed D becomes equal to or less than the determination threshold value Dth. Since the accelerator opening degree A at this time is smaller than the allowable lower limit value A*_min, the holder 52 is moved to the reaction force reduction position H3 to reduce the reaction force. From time x42 to time x43, the reaction force increases as the driver depresses the pedal lever 20. At time x44, when the accelerator opening degree A is stable within the target range Ra including the target accelerator opening degree A*, the switching operation to the manual drive is permitted, and the holder 52 is returned to the initial position. It should be noted that, when the accelerator opening degree A reaches the target range Ra, the wall feel to the driver may be applied by moving the holder 52 to the wall feel application position H1, or, when the accelerator opening degree A exceeds the target range Ra, the reaction force may be increased by moving the holder 52 to the push-back position H2.

In the present embodiment, the power transmission mechanism 50 is controlled, such that when the accelerator opening degree A exceeds the target range Ra, the reaction force becomes greater than that when the accelerator opening degree A reaches the target range Ra. The accelerator opening degree A becomes within the target range Ra by pushing back the pedal lever 20, and thereby it is possible to induce and set an appropriate opening degree.

Further, when the pedal lever 20 stays in a state where the accelerator opening degree A has not reached the target range Ra, the power transmission mechanism 50 is controlled to reduce the reaction force. In such manner, the pedal lever 20 is made relatively light, and the appropriate accelerator opening degree A can be obtained by inducing the driver's stepping and depressing. Thus, the same advantages as the above-described embodiments are achievable.

In the embodiments, the motor 40 corresponds to an "actuator", the power transmission mechanism 50 corresponds to a "reaction force adjuster", the ECU 60 corresponds to a "controller", and the accelerator opening degree A corresponds to a "pedal lever operation amount," and the target accelerator opening degree A* corresponds to a "target operation amount."

Other Embodiments

In the above embodiments, a wall feel is given in the target range, or a pulse-like reaction force is applied. In other embodiments, the details of the reaction force control may be different from those in the above embodiments, as long as it is possible to notify the driver that the pedal lever operation amount is within the target range, or to induce the operation amount into the target range. The notification device of the above embodiments includes a display device and a speaker. In other embodiments, the notification device is not limited to a display device or a speaker, and any method of notification may be used for notification to the driver.

In the above embodiments, the actuator is a DC brushless motor, as an example. In other embodiments, the actuator may be a motor of a type other than the DC brushless motor, or a device other than the motor such as a solenoid may be used as the actuator. In the above embodiments, the accelerator device has been described as a floor-disposed type device (i.e., a so-called "organ type" device). In other embodiments, the accelerator device may be a hanging type device (i.e., a so-called "pendant type" device). Also, the power transmission mechanism may be configured differently from the above embodiments.

In the above embodiments, the reaction force is adjusted by controlling the holder position, as an example. In other embodiments, the configuration may be different from the above embodiment as long as the reaction force applied to the pedal lever can be adjusted. Also, the power transmission mechanism may be configured differently from the above embodiments.

For example, an accelerator device includes a pedal lever configured to operate in accordance with a stepping operation, a power transmission mechanism driven by an actuator and configured to adjust a reaction force that is a force in a direction of pushing back the pedal lever, and a controller including at least one processor. In this case, the controller may be configured to set a target operation amount of the pedal lever in accordance with a vehicle speed, to control the reaction force by controlling an operation of the actuator, and to control an operation amount of the pedal lever to be within a target range by controlling the reaction force in accordance with the target operation amount of the pedal lever. In addition, the controller may be configured to permit a switching from an automatic drive to a manual drive, when the operation amount of the pedal lever is stabilized within the target range. Thus, the switching from an automatic drive to a manual drive can be suitably performed.

The controller and the method thereof described in the present disclosure may be realized by using a dedicated computer which is configured with a memory and a processor programmed to execute one or more particular functions embodied as a computer program. Alternatively, the controller and the method thereof described in the present disclosure may be realized by using a dedicated computer configured as a processor with one or more dedicated hardware logic circuits. Alternatively, the controllers and the method described in the present disclosure may be realized by using one or more dedicated computers, which are provided as a combination of the processor and the memory programmed to execute one or more functions and the processor implemented by one or more hardware logic circuits. Further, the computer program may be stored, as instructions to be executed by a computer, in a tangible, non-transitory, computer-readable storage medium. The present disclosure as in the above, is not limited to the above-described embodiments but various modifications may be made within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may also be encompassed in the scope of the present disclosure.

What is claimed is:

1. An accelerator device comprising:
a pedal lever configured to operate in accordance with a stepping operation;
a reaction force adjuster driven by an actuator and capable of adjusting a reaction force that is a force in a direction of pushing back the pedal lever; and
a controller including:
a target operation amount setting unit configured to set a target operation amount of the pedal lever in accordance with a vehicle speed; and
a drive control unit configured to control a drive of the actuator,
wherein the controller is configured to control the reaction force in accordance with the target operation amount of the pedal lever so as to make an operation amount of the pedal lever to be within a target range, when switching from an automatic drive to a manual drive,
wherein the controller is configured to control the reaction force adjuster such that the reaction force becomes larger when the operation amount of the pedal lever reaches the target range, than that before reaching the target range, and
wherein the controller is configured to perform a reaction force return control in which the reaction force returns to an initial state by gradually changing the reaction force, when the operation amount of the pedal lever is stabilized within the target range.

2. The accelerator device of claim 1, wherein
the controller is configured to control the reaction force adjuster such that the reaction force becomes larger when the operation amount of the pedal lever exceeds the target range, than that when the operation amount reaches the target range.

3. The accelerator device of claim 1, wherein
the controller is configured to generate a pulse-like reaction force at least once, when the operation amount of the pedal lever reaches the target range.

4. The accelerator device of claim 1, wherein
the controller is configured to permit the switching from the automatic drive to the manual drive, when the operation amount of the pedal lever is stabilized within the target range.

5. The accelerator device of claim 1, wherein
the controller includes a notification control unit configured to notify a driver of information related to the target operation amount via a notification device.

6. The accelerator device of claim 5, wherein
the notification control unit causes the notification device to notify the driver of an operation instruction relating to an operation direction of the pedal lever.

7. An accelerator device comprising:
a pedal lever configured to operate in accordance with a stepping operation;
a reaction force adjuster driven by an actuator and capable of adjusting a reaction force that is a force in a direction of pushing back the pedal lever; and
a controller including:
a target operation amount setting unit configured to set a target operation amount of the pedal lever in accordance with a vehicle speed; and
a drive control unit configured to control a drive of the actuator,
wherein the controller is configured to control the reaction force in accordance with the target operation amount of the pedal lever so as to make an operation amount of the pedal lever to be within a target range, when switching from an automatic drive to a manual drive,
wherein the controller is configured to control the reaction force adjuster such that the reaction force becomes larger when the operation amount of the pedal lever reaches the target range, than that before reaching the target range, and
when the pedal lever stays for a predetermined time in a state in which the operation amount of the pedal lever is less than the target range, the controller controls the reaction force adjuster to reduce the reaction force.

8. The accelerator device of claim 7, wherein
the controller is configured to perform a reaction force return control in which the reaction force returns to an initial state by gradually changing the reaction force, when the operation amount of the pedal lever is stabilized within the target range.

9. An accelerator device comprising:
a pedal lever configured to operate in accordance with a stepping operation;
a power transmission mechanism driven by an actuator and configured to adjust a reaction force that is a force in a direction of pushing back the pedal lever; and
a controller including at least one processor, and configured
to set a target operation amount of the pedal lever in accordance with a vehicle speed,
to control the reaction force by controlling an operation of the actuator, to control an operation amount of the pedal lever to be within a target range by controlling the reaction force in accordance with the target operation amount of the pedal lever, and
to permit a switching from an automatic drive to a manual drive, when the operation amount of the pedal lever is stabilized within the target range,
to control the reaction force adjuster such that the reaction force becomes larger when the operation amount of the pedal lever reaches the target range, than that before reaching the target range, and
to perform a reaction force return control in which the reaction force returns to an initial state by gradually changing the reaction force, when the operation amount of the pedal lever is stabilized within the target range.

10. The accelerator device of claim 9, wherein
the controller is configured to control the reaction force to be larger when the operation amount of the pedal lever exceeds the target range, than that when the operation amount reaches the target range.

* * * * *